Figure 1:
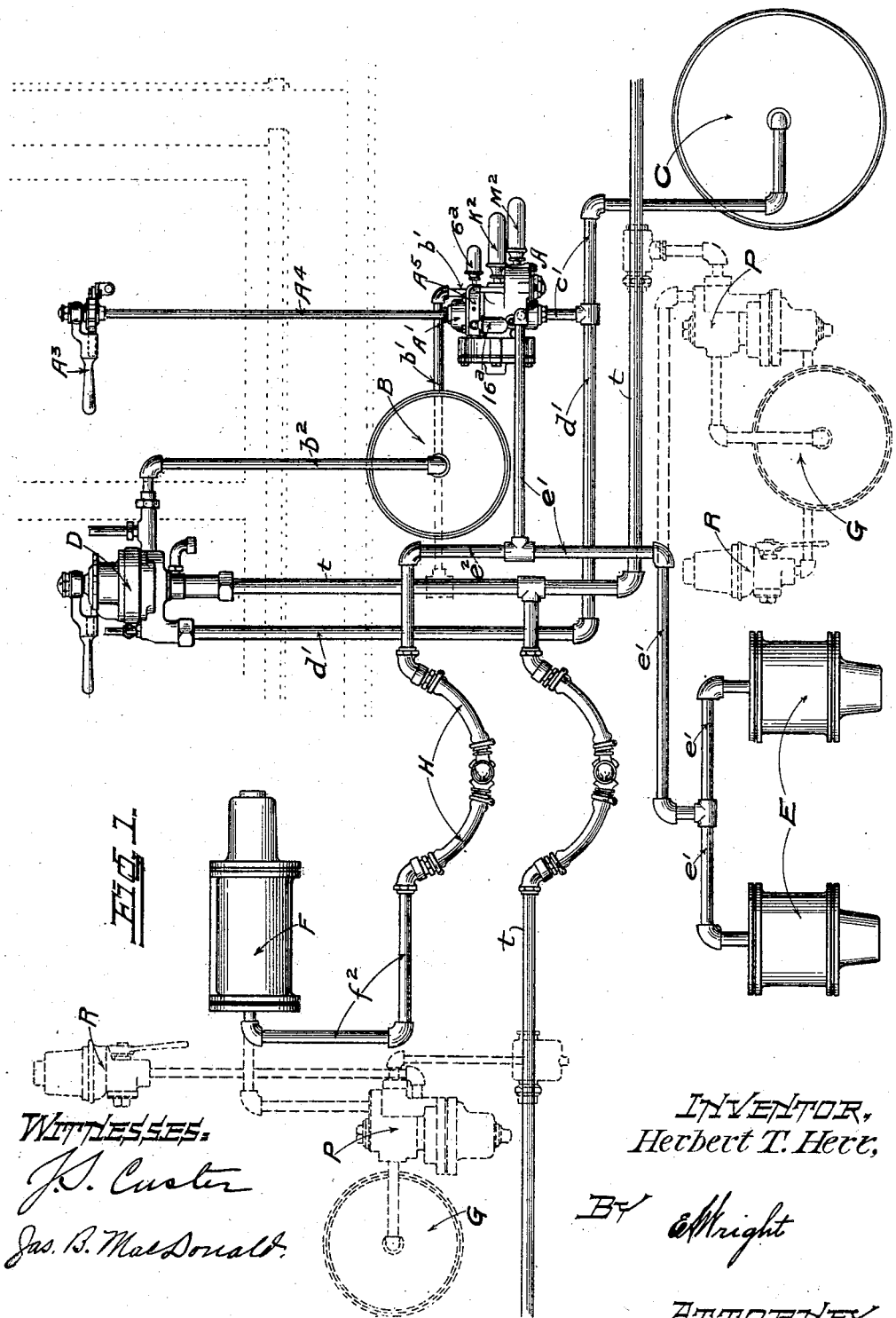

H. T. HERR.
FLUID PRESSURE BRAKE.
APPLICATION FILED DEC. 23, 1903.

898,885.

Patented Sept. 15, 1908.
5 SHEETS—SHEET 2.

WITNESSES:
J. S. Custer
Jas. B. MacDonald

INVENTOR
Herbert T. Herr,
By E. Wright
ATTORNEY

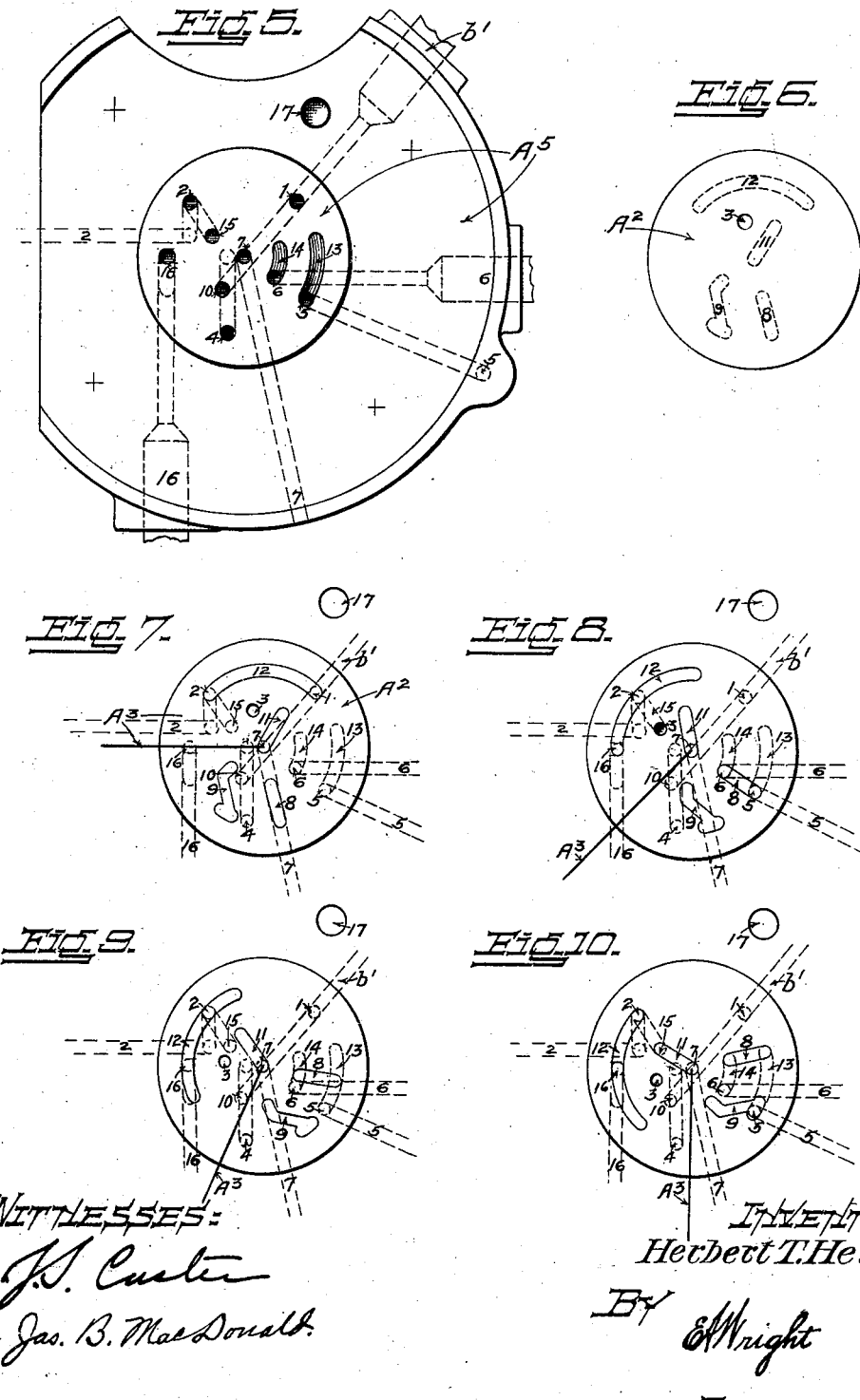

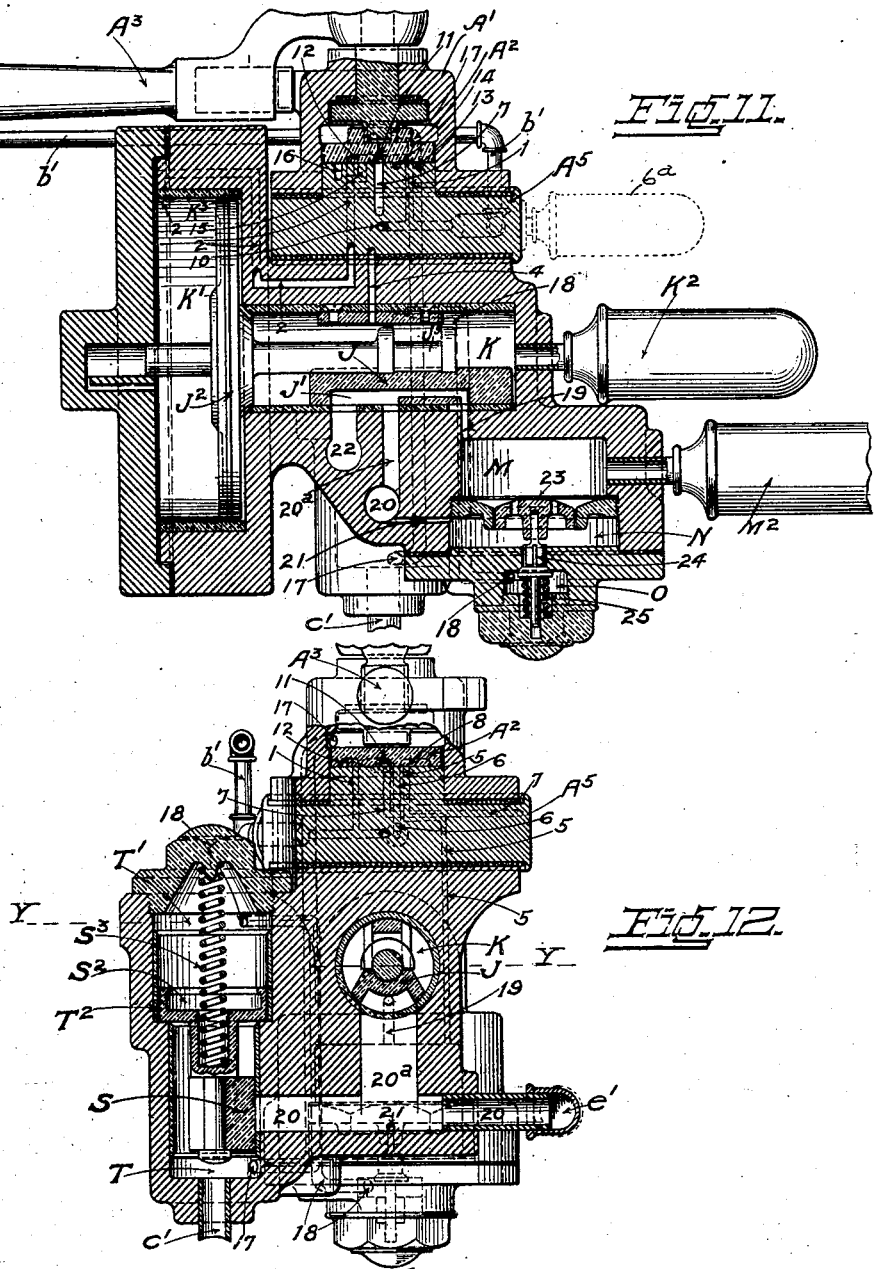

H. T. HERR.
FLUID PRESSURE BRAKE.
APPLICATION FILED DEC. 23, 1903.
898,885.
Patented Sept. 15, 1908.
5 SHEETS—SHEET 5.
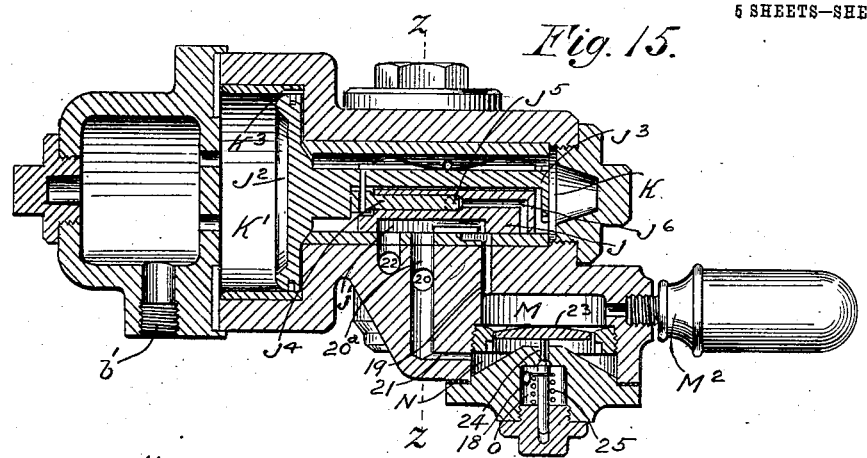
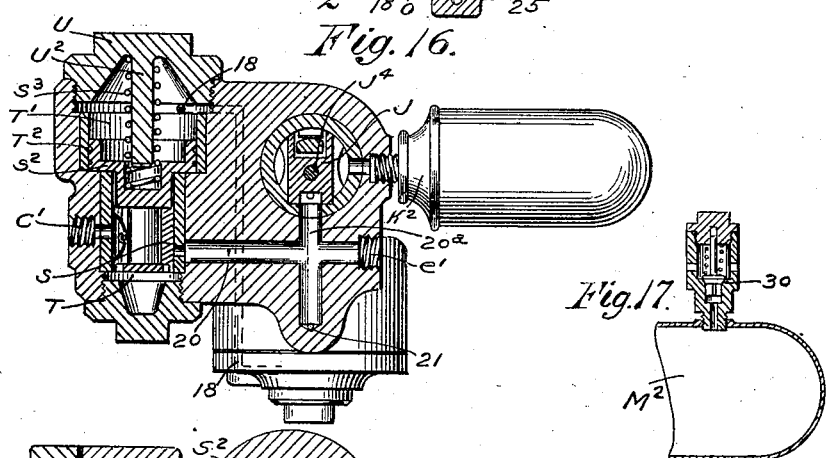
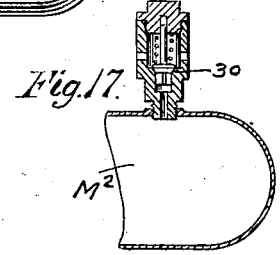
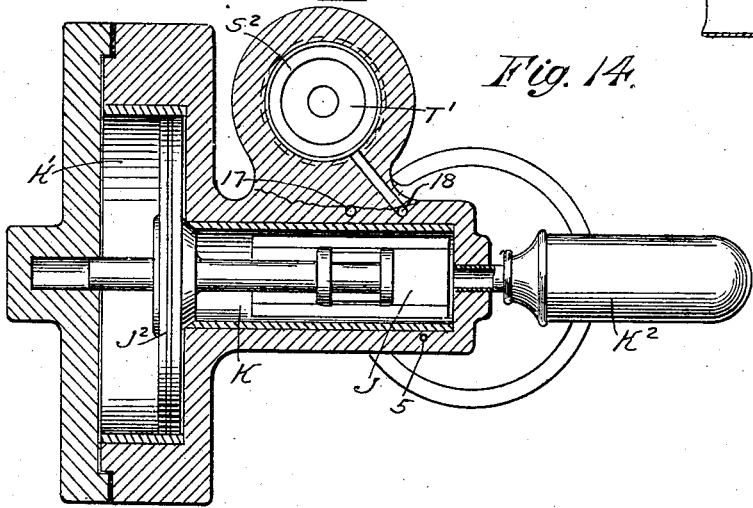
WITNESSES
INVENTOR
Herbert T Herr
By E. Wright
Att'y.

UNITED STATES PATENT OFFICE.

HERBERT T. HERR, OF ROANOKE, VIRGINIA, ASSIGNOR TO THE WESTINGHOUSE AIR BRAKE COMPANY, OF PITTSBURG, PENNSYLVANIA, A CORPORATION OF PENNSYLVANIA.

FLUID-PRESSURE BRAKE.

No. 898,885.      Specification of Letters Patent.      Patented Sept. 15, 1908.

Application filed December 23, 1903. Serial No. 186,320.

*To all whom it may concern:*

Be it known that I, HERBERT T. HERR, a citizen of the United States, residing in Roanoke, county of Roanoke, and State of Virginia, have invented a certain new and useful Improvement in Fluid-Pressure Brakes, of which improvement the following is a specification.

This invention relates to automatic fluid pressure brakes, and more particularly to that portion of the equipment usually mounted on the locomotive and tender, as set forth in my caveat filed April 15th, 1903. As is well known, the standard apparatus as heretofore used in this connection comprises the air pump, main reservoir, train pipe, engineer's brake valve, auxiliary reservoir, triple valve and brake cylinders as applied to the locomotive proper, and an additional auxiliary reservoir, triple valve and brake cylinder as applied to the tender. It has also been the practice to provide some locomotives, especially those used in switching and shifting cars, with an additional straight air brake valve and pipe connections therefrom to the main reservoir and to the brake cylinders operating independently of the automatic system, whereby the brakes on the locomotive and tender may be controlled by straight air from the main reservoir whenever desired.

One of the objects of this invention is to provide a valve device for supplying air directly from the main reservoir to the brake cylinders and operated by the same movements of the engineer's brake valve as used in operating the automatic train brakes in the usual way, thereby dispensing with the auxiliary reservoirs and triple valves.

Another object of this invention is to provide an improved valve device for operating the engine and tender brakes by means of air from the main reservoir independently of the train brakes; and a further object is to so combine these devices that the same manually operated valve used for controlling the independent brake may be employed for connecting the device with the standard automatic equipment to operate by the usual movements of the engineer's brake valve.

Still another object of the invention is to provide an improved valve device which may be applied to either locomotives or cars for controlling the supply of air to and its release from the brake cylinder, and operated in response to suitable variations in train pipe pressure.

Figure 2:
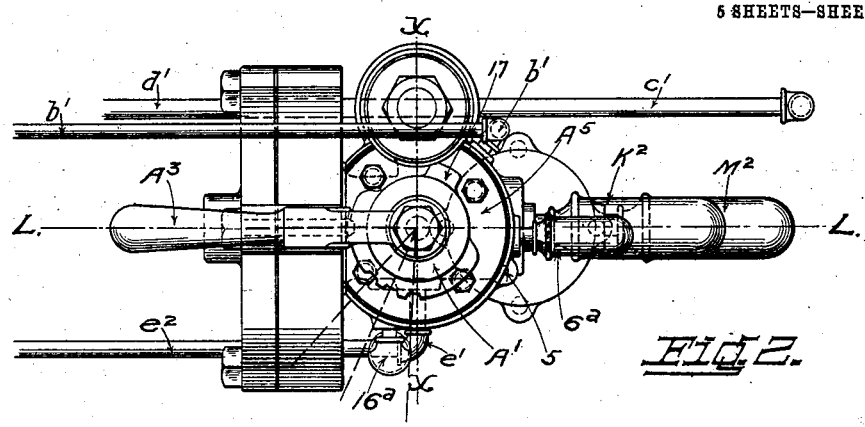
Figure 3:
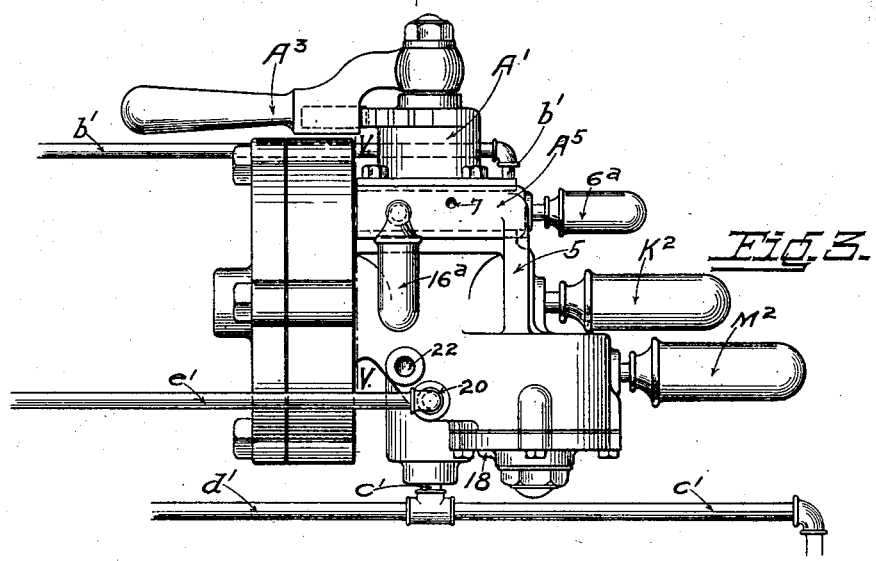
Figure 4:
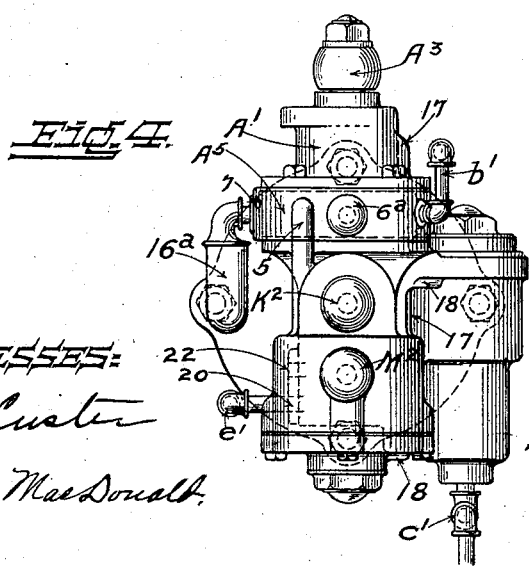

In the accompanying drawings, Figure 1 is a diagrammatic view of the standard Westinghouse automatic air brake equipment for an engine and tender showing my improved valve device applied thereto, the ordinary triple valves P, auxiliary reservoirs G, and retaining valves R, which may be dispensed with by the use of my improvement, being indicated in dotted lines; Figs. 2, 3 and 4 a plan, side elevation and end elevation respectively, of my improved valve device; Fig. 5 an enlarged detail plan view of the valve seat of the independent manually operated rotary valve; Fig. 6 a plan view of the rotary valve; Fig. 7 a diagrammatic plan view of the rotary valve mounted on its seat and showing the relative position of the ports when the rotary valve is in its first or automatic position; Figs. 8, 9 and 10 corresponding views showing the rotary valve in release, lap, and application positions respectively for operating with straight air from the main reservoir independently of the train brakes; Fig. 11 a longitudinal section of my improved combined valve device taken on the line L—L of Fig. 2; Fig. 12 a transverse section of the same taken on the line X—X of Fig. 2; Fig. 13 a broken transverse section taken on the line V—V of Fig. 3; Fig. 14 a horizontal section taken on the line Y—Y of Fig. 12; Fig. 15 a longitudinal section of one form of my improved valve device adapted for automatic service only and showing a modification of the graduating features; Fig. 16 a transverse section taken on the line Z—Z of Fig. 15; and Fig. 17 a detached detail view showing in section a safety valve applied to the regulating chamber or reservoir.

Referring to Fig. 1, the engineer's brake valve D is connected by pipe $d'$ with the main reservoir C, by pipe $b^2$ with the equalizing reservoir B, and to the train pipe $t$ leading to the triple valves P and auxiliary reservoirs G throughout the train. On the locomotive the pipes $e'$ lead to the brake cylinders E and branch pipe $e^2$ communicates by a hose connection H with pipe $f^2$ leading to the brake cylinder F on the tender. This apparatus as thus far described comprises the ordinary and well known equipment of the standard Westinghouse automatic air brake system.

In order to illustrate my invention, I have shown the several features thereof embodied in one combined valve device represented at A in Fig. 1 and having connection with the main reservoir pipe $c'$, the brake cylinder pipe $e'$, and with the train pipe or the equalizing reservoir by means of pipe $b'$. But while I have shown the various parts combined in this manner, it will be understood that they are not necessarily so used in practice, since it will be evident that they may be differently arranged, and that some of the features may be operated independently of the others.

According to the construction shown in the drawings, the main body of the valve device is provided with a valve chamber K, of what may be termed the triple valve portion of the device, comprising the slide valve J connected by a stem $J^3$ with a movable abutment or piston $J^2$ located in piston chamber K' having a feed groove $K^3$ communicating with the chamber K, which together with the connected reservoir or chamber $K^2$ may be called the auxiliary pressure chamber.

The slide valve J has a port or cavity J' adapted to establish communication from the brake cylinder ports $20^a$ and 20, and also from the port 19 to the exhaust port 22 when the valve is in its release position, as shown. When the valve is moved back to service position the brake cylinder port $20^a$ is closed by a portion of the valve J while the port 19 is opened, thereby establishing communication from the auxiliary pressure chamber to the regulating chamber M of what may be termed the regulating valve device for controlling the supply of fluid under pressure from the main reservoir to the brake cylinder. A small reservoir $M^2$ may be connected to the chamber M forming an enlargement thereof, in order to give the desired capacity to the regulating chamber.

Any desired form of regulating valve may be employed, and as a preferred construction I have shown a diaphragm 23 subject on one side to the pressure of the regulating chamber M and on the other side to the pressure of the chamber N which communicates through passage 21 with the brake cylinder passage 20, the diaphragm being adapted to control the small valve 24 for opening and closing communication from the port 18 and chamber O beneath the valve to the chamber N and the brake cylinder, a light spring 25 being used to seat the valve when the pressures on opposite sides of the diaphragm 23 are substantially equal. The main valve S of the regulating valve device is located in a chamber T and connected with its operating piston or abutment $S^2$ which is exposed on the valve side to the main reservoir pressure admitted through pipe $c'$, and on its opposite side to pressure in chamber T' which communicates through port or passage 18 with the chamber O beneath the small regulating valve 24.

A spring $S^3$ normally tends to force the piston and valve to its lowermost position with brake cylinder port 20 closed and a leakage groove or space $T^2$ is provided to allow the pressure to equalize around the piston $S^2$.

According to the combined construction shown on Sheets 1 to 4 of the drawings, a manually operated rotary valve $A^2$ mounted on a valve seat $A^5$ is secured to the casing and provided with a cap A' and a handle $A^3$ within reach of the engineer.

The rotary valve seat is provided with various ports and passages as follows:—2 leading down through the seat and casing to the rear of the piston chamber K', 1 communicating with the pipe $b'$ leading from the train pipe or equalizing reservoir, 6 leading to a small supplemental reservoir or chamber $6^a$, 5 leading down to and communicating with the regulating chamber M, 4 leading to the auxiliary pressure chamber K, 15 communicating with passage 2, 10 communicating with passage 1, 16 leading to the small reservoir $16^a$, and exhaust port 7 leading to the atmosphere. Ports 5 and 6 are provided with extension grooves or cavities 13 and 14 in the face of the valve seat.

The rotary valve $A^2$ is provided with a through port 3 and cavities 8, 9 and 12 for coöperating with the ports in the valve seat. Main reservoir pressure is supplied to the cap chamber on the top of the rotary valve through the port 17 which leads from the main reservoir chamber of the main slide valve S of the regulating valve device.

According to the modification shown in Figs. 15 and 16, the device is adapted for automatic service only, the rotary valve and its seat being dispensed with and the pipe $b'$ leading from the train pipe or equalizing reservoir being connected directly into chamber K' in the rear of the piston $J^2$ of the valve device. A graduating valve $J^4$ coöperating with ports $J^5$ and $J^6$ in the slide valve is employed for graduating the pressure from the auxiliary chamber K $K^2$ to the regulating chamber M $M^2$. Port 17 is also dispensed with in this modification and a stem $U^2$ extending from the cap U is provided for limiting the movement of the piston $S^2$ and main slide valve S of the regulating valve device. This construction may be termed a distributing valve device, and it is apparent that the same may be applied either to locomotives or cars for controlling the supply of air to the brake cylinders, since the device operates in response to the usual variations in train pipe pressure, and in the latter case it will also be evident that the reservoir or source of pressure for the brake cylinder may be supplied in any convenient manner, as desired.

The operation of this form of my improvement is as follows: The parts being in the position shown and the system charged to normal pressure, air at train pipe pressure will enter chamber K', and feeding through the groove $K^3$ will charge the auxiliary chamber K to the same pressure. At this time the brake cylinder and the regulating chamber M are in communication with the atmosphere through their ports 20, and 19, the exhaust cavity J and the exhaust port 22. Fluid under pressure from the main reservoir or other source is admitted by pipe $c'$ to chamber T on the back of valve S and against its operating abutment or piston $S^2$. This pressure immediately leaks around the circumference $T^2$ of the piston into chamber T' which communicates through port 18 with chamber O and small regulating valve 24. This valve being closed, since there is no pressure on diaphragm 23, the pressure in chamber T' immediately rises to equal that of the main reservoir in chamber T, thus balancing the fluid pressure on opposite sides of the piston $S^2$, so that the spring $S^3$ holds the piston down to its lowermost position with main slide valve S closed.

When the train pipe pressure is reduced for the purpose of applying the automatic train brakes, the air in chamber K' is correspondingly reduced and the predominating pressure of the auxiliary chamber K acting on the opposite side of the piston causes the same to move back and establish communication from the said auxiliary chamber through ports $J^5$, $J^6$ and 19 with the regulating chamber M. As soon as the pressure in the auxiliary chamber has diminished by expansion into the regulating chamber to a point slightly less than that of the train pipe, the piston $J^2$ moves forward with graduating valve $J^4$ and closes the port $J^6$ leaving the main slide valve J in lap position with the exhaust port closed.

The auxiliary chamber, the regulating chamber and graduating port, are calculated to have the same relative volumes and capacities as the usual auxiliary reservoir, brake cylinder and triple valve service port, so that the action of this triple valve portion of the device corresponds with that of an ordinary triple valve, and each successive reduction of train pipe pressure operates to graduate an additional degree of pressure into the regulating chamber M, which pressure in all cases is substantially equal to the desired brake cylinder pressure. This pressure in the regulating chamber acting on the diaphragm 23 immediately opens the small valve 24, thereby permitting the escape of the air in chamber T' through ports 18, 21 and 20 to the brake cylinder, so that the predominating pressure on the opposite side of the piston $S^2$ in chamber T moves the piston and valve upward against the spring $S^3$ and opens the port 20 leading to the brake cylinder. Air from the main reservoir or other source of pressure is thereby supplied to the brake cylinder and to the communicating chamber N until the pressure therein rises to substantially equal that of the regulating chamber M above the diaphragm, at which time the spring 25 causes the closure of the small valve 24, thereby preventing further escape of air from chamber T' to the brake cylinder. As the pressure in chamber T immediately equalizes around the piston $S^2$ the spring $S^3$ then moves the same and slides valve S to cut off further supply of air to port 20 and the brake cylinder. Further reduction of train pipe pressure operates in a similar manner to increase the brake cylinder pressure, the regulating valve device always acting to supply and maintain the brake cylinder pressure to correspond with the pressure admitted to the regulating chamber M.

If the pressure in the brake cylinder, and consequently in chamber N beneath the regulating diaphragm, diminishes on account of leakage after an application is made, it is evident that the constant pressure in chamber M will move the diaphragm down to open small valve 24 and slide valve S to supply any such leakage and consequently maintain the brake cylinder pressure constant and equal to that charged into the regulating chamber as long as the brakes remain applied.

When it is desired to release the brakes the train pipe pressure is increased in the usual way, thereby forcing the piston $J^2$ over to full release position, in which the brake cylinder port 20 and port 19 are open to the exhaust port 22 and the air under pressure in the brake cylinder and in the regulating chamber is released to the atmosphere, the slide valve S and small valve 24 remaining closed since the pressure is balanced on opposite sides of the regulating diaphragm 23.

With the construction of my improvement shown in Figs. 1–14, and adapted for either automatic or independent service, the rotary valve $A^2$ normally occupies the position shown in Figs. 7 and 11, the cavity 12 in the face of the rotary valve forming communication between the ports 1 and 2 whereby the fluid under pressure from the train pipe or equalizing reservoir is admitted through pipe $b'$ to the piston chamber K', all other ports being closed. In this position the device is set to operate the engine and tender brakes automatically by the usual movements of the engineer's brake valve in handling the automatic train brakes in the same manner as heretofore described in connection with the modification shown in Figs. 15 and 16, except that the graduations of air pressure from the auxiliary chamber K to the regulating chamber M are performed by the slide valve J without the use of a graduating valve. Otherwise the operation is the same and will not need to be further described.

When it is desired to operate the locomotive brakes, independently of the train brakes, the handle $A^3$ of the rotaty valve $A^2$ is turned to the straight air release position shown diagrammatically in Fig. 8. In this position the train pipe is cut off and air at main reservoir pressure is admitted from chamber T through port 17 to the rotary valve chamber and down through port 3 to port 15, passage 2 and to the chamber K'. If previous to the movement of the independent manually operated valve to release position the brakes stand applied by the automatic system, it is evident that this air under pressure from the main reservoir admitted to chamber K' will operate to move the piston $J^2$ and valve J to release position and thereby release the air pressure from the engine brake cylinders. The piston $J^2$ being in release position, as shown, air feeds through groove $K^3$ and charges auxiliary chamber K at main reservoir pressure. At the same time the cavity 8 in the rotary valve connects the ports 5 and 6 in the valve seat, thereby establishing communication between the regulating chamber M and the supplemental chamber $6^a$ thus increasing the volume or capacity of the regulating chamber to that extent in order to adapt the regulating device for working with the main reservoir pressure.

The port 16 in the rotary valve seat is also put in communication with the passage 2 and chamber K', in this position of the valve, whereby the volume of this chamber is increased to the extent of the capacity of chamber $16^a$.

To apply the locomotive brakes, the handle $A^3$ is now turned to the independent application position indicated in diagram in Fig. 10. The cavity 11 of the rotary valve then connects ports 15 and 7 in the seat and a portion of the air under pressure in chamber K' is released to the atmosphere. Port 3 is closed in this position, so there is no further admission of air from the main reservoir and this reduction of pressure in chamber K' causes the piston $J^2$ to move back in the same manner as in the service application before described, opening graduating port 19 and closing the exhaust from the brake cylinder. When the desired reduction is made from chamber K' the rotary valve is immediately moved to lap position, indicated in Fig. 9, in which position the cavity 11 is out of register with port 15 and the discharge ceases. The piston $J^2$ then returns to lap position as soon as the pressure in the auxiliary chamber has expanded into the regulating chamber sufficiently to reduce the pressure in the auxiliary chamber to a point slightly less than that remaining in chamber K' on the opposite side of the piston, thus closing port 19 but not opening the exhaust. The regulating valve device then operates in the same manner already described for supplying the brake cylinder with pressure substantially equal to that in the regulating chamber M. The braking pressure may then be increased, if desired, by further movements of the handle $A^3$ to application position, Fig. 10, and back to lap position, Fig. 9. In order to release the brakes at any time, the handle $A^3$ is returned to release position, Fig. 8, in which pressure from the main reservoir is again admitted through ports 3, 15 and 2 to chamber K', forcing piston $J^2$ and valve J to release position, whereby the brake cylinder and chambers N and M are put in communication with the atmosphere through ports 20, 21, $20^a$, 19, cavity J' and exhaust port 22.

It will be noted that in the three positions of the rotary valve the ports 5 and 6 are connected by means of their grooves 13 and 14 and cavity 8 of the rotary valve, and also that port 16 communicates in all of these positions with the port 2 through the cavity 12. By this means the capacities of the chambers K' and M are increased in order to compensate for the higher working pressure and secure a safe and desirable degree of pressure in the regulating chamber which will not cause excessive braking pressure upon the wheels.

When it is desired to set the rotary valve for automatic service again, the handle $A^3$ is turned from its position shown in Fig. 8 to its first position, Fig. 7, and as the cavity 9 in the rotary valve passes over the ports 4 and 10 communication is momentarily established between the auxiliary chamber K and the train pipe or equalizing reservoir, whereby the higher pressure which was held in the auxiliary chamber is equalized to that of the train pipe, so that when the valve reaches first position in which chamber K' is put into communication with the train pipe, there will be no movement of the piston $J^2$ caused by a higher pressure being stored in the auxiliary chamber K, otherwise this movement of the valve might cause an application of the locomotive brakes when not desired.

By means of safety valve, such as indicated at 30, Fig. 17, applied to the regulating chamber $M^2$, and having its spring adjusted to blow off any pressure which is greater than a safe or desirable brake cylinder pressure, the additional chambers $6^a$ and $16^a$ for increasing the capacities of chambers M and K' may be dispensed with, together with the ports 5, 6, 13, 14, 16, and cavity 8 of the rotary valve. In this case the pressure charged into the regulating chamber and the corresponding brake cylinder pressure will be limited to that for which the spring of the safety valve is adjusted.

Having now described my invention, what I claim as new and desire to secure by Letters Patent is:—

1. In a fluid pressure brake, the combination with a main reservoir, train pipe, and an engineer's brake valve having a service application position for making a gradual reduction in train pipe pressure and an emergency position for making a sudden and rapid reduction in train pipe pressure for operating the automatic train brakes, of means operated by the movement of the engineer's brake valve to service position for supplying air from the main reservoir to the locomotive brake cylinders.

2. In a fluid pressure brake, the combination with a main reservoir, train pipe, and an engineer's brake valve having a service application position for making a gradual reduction in train pipe pressure and an emergency position for making a sudden and rapid reduction in train pipe pressure, of a valve operating to supply air from the main reservoir directly to the locomotive brake cylinder when the engineer's brake valve is moved to service position for applying the automatic train brakes.

3. In an automatic fluid pressure brake system, the combination with a main reservoir, engineer's brake valve, train pipe and brake cylinder, of means operated by variations in train pipe pressure for controlling the supply of fluid under pressure from the main reservoir to the brake cylinder.

4. In an automatic fluid pressure brake, the combination with a main reservoir, engineer's brake valve, train pipe and brake cylinder, of means operated by the reduction in train-pipe pressure made by the engineer's brake valve in applying the brakes, for supplying fluid from the main reservoir to the brake cylinder.

5. In an automatic fluid pressure brake, the combination with a main reservoir, engineer's brake valve, train pipe and brake cylinder, of a valve device operated by variations in train-pipe pressure produced by the engineer's brake valve, for controlling the supply of fluid from the main reservoir to the brake cylinder.

6. In an automatic fluid pressure brake, the combination with a main reservoir, engineer's brake valve, train pipe and brake cylinder, of a valve device operated by a reduction in train pipe pressure for supplying fluid from the main reservoir to the brake cylinder and by an increase of train pipe pressure for releasing said fluid to the atmosphere.

7. In a fluid pressure brake, the combination with a main reservoir, engineer's brake valve, train pipe and brake cylinder, of a regulating valve mechanism for supplying fluid from the main reservoir to the brake cylinder, and means operated by variations in train pipe pressure for graduating the pressure applied to said regulating valve mechanism.

8. In a fluid pressure brake, the combination with a reservoir, train pipe and brake cylinder, of a regulating valve mechanism for controlling the supply of fluid from the reservoir to the brake cylinder, and means operated in accordance with variations of train pipe pressure for admitting fluid at the desired brake cylinder pressure to the regulating chamber of said mechanism.

9. In a fluid pressure brake, the combination with a reservoir, train pipe and brake cylinder, of a regulating valve mechanism for controlling the supply of fluid from the reservoir to the brake cylinder, and a movable abutment and valve subject to the variations of train pipe pressure for admitting fluid to the regulating chamber of said mechanism.

10. In a fluid pressure brake, the combination with a reservoir, train pipe and brake cylinder, of a regulating valve mechanism having a chamber containing a diaphragm for controlling the supply of fluid from the reservoir to the brake cylinder, and a valve device operated by variations of train pipe pressure for admitting fluid to the regulating chamber and for releasing the fluid from the brake cylinder.

11. In a fluid pressure brake, the combination with a reservoir, train pipe and brake cylinder, of a regulating valve mechanism having a chamber containing a diaphragm for controlling the supply of fluid from the reservoir to the brake cylinder, and a valve having a movable abutment subject to the opposing pressures of the train pipe and an auxiliary chamber for admitting fluid to the regulating chamber.

12. In a fluid pressure brake, the combination with a reservoir, train pipe and brake cylinder, of a regulating valve mechanism having a chamber containing a diaphragm for controlling the supply of fluid from the reservoir to the brake cylinder, and a valve having a movable abutment subject to the opposing pressures of the train pipe and an auxiliary chamber for admitting fluid to the regulating chamber and for releasing the fluid from the brake cylinder.

13. In a fluid pressure brake, the combination with a reservoir, train pipe and brake cylinder, of a valve controlling communication from the reservoir to the brake cylinder, a movable abutment for operating said valve, a regulating valve for varying the pressure on one side of said abutment, a diaphragm for actuating the regulating valve and subject to the opposing pressures of the brake cylinder and a regulating chamber, and means operated by variations of train pipe pressure for admitting fluid to the regulating chamber.

14. In a fluid pressure brake, the combination with a reservoir, train pipe and brake cylinder, of a valve controlling communication from the reservoir to the brake cylinder, a movable abutment for operating said valve, a regulating valve governed by the opposing pressures of the brake cylinder and a regulating chamber for releasing fluid under pressure from one side of said abutment, and means operated by variations in train pipe pressure for regulating the pressure in said chamber.

15. In a fluid pressure brake, the combination with a reservoir, train pipe and brake cylinder, of a valve controlling communication from the reservoir to the brake cylinder, a movable abutment exposed on one side to main reservoir pressure for operating said valve, a regulating valve governed by the opposing pressures of the brake cylinder and a regulating chamber for releasing fluid from the opposite side of said abutment to the brake cylinder, and means operated by variations of train pipe pressure for regulating the pressure in said chamber.

16. In a fluid pressure brake, the combination with a reservoir and brake cylinder, of a regulating valve device governed by the opposing pressures of the brake cylinder and a regulating chamber for supplying fluid from the reservoir to the brake cylinder, and means for adjusting the pressure in said chamber according to the desired brake cylinder pressure.

17. In a fluid pressure brake, the combination with a reservoir and brake cylinder, of a regulating valve device governed by the opposing pressures of the brake cylinder and a regulating chamber for supplying fluid from the reservoir to the brake cylinder, and a manually controlled valve mechanism for admitting fluid to said chamber.

18. In a fluid pressure brake, the combination with a reservoir and brake cylinder, of a regulating valve device governed by the opposing pressures of the brake cylinder and a regulating chamber for supplying fluid from the reservoir to the brake cylinder, a movable abutment and valve for admitting fluid to said chamber, and a manually operated valve for controlling the pressure on one side of said abutment.

19. In a fluid pressure brake, the combination with a reservoir and brake cylinder, of a regulating valve device having a chamber for controlling the supply of fluid from the reservoir to the brake cylinder, a valve device having a piston subject to the opposing pressures of a piston chamber and an auxiliary chamber for admitting fluid from the auxiliary chamber to the regulating chamber, and a manually operated valve for varying the pressure on one side of said piston.

20. In a fluid pressure brake, the combination with a reservoir and brake cylinder, of a regulating valve device having a chamber for controlling the supply of fluid from the reservoir to the brake cylinder, a valve device having a piston subject to the opposing pressures of a piston chamber and an auxiliary chamber, and a valve for admitting fluid to said regulating chamber and for releasing said brake cylinder, and a manually operated valve having ports for supplying fluid to said piston chamber in one position and releasing said fluid therefrom in another position.

21. In a fluid pressure brake, the combination with a main reservoir, train pipe and brake cylinder of a regulating valve device for controlling the supply of fluid from the main reservoir to the brake cylinder, a valve device having a piston and valve for varying the pressure upon the regulating valve device, and a manually operated valve having ports for establishing communication between the train pipe and the piston chamber in one position and between the main reservoir and the piston chamber in another position.

22. In a fluid pressure brake, the combination with a main reservoir, train pipe and brake cylinder of a regulating valve device for controlling the supply of fluid from the main reservoir to the brake cylinder, a valve device having a piston and valve for varying the pressure upon the regulating valve device, and a manually operated valve having ports for establishing communication from the piston chamber to the train pipe in one position, to the main reservoir in another position, and to the atmosphere in a third position.

23. In a fluid pressure brake, the combination with a main reservoir, train pipe and brake cylinder, of a regulating valve device having a chamber for controlling the supply of fluid from the main reservoir to the brake cylinder, a valve device for varying the pressure upon the regulating valve device and having a piston subject to the opposing pressures of a piston chamber and an auxiliary chamber, a manually operated valve having ports for establishing communication from the piston chamber to the train pipe in one position, and in another position to close communication to the train pipe and open communication to the main reservoir, and means for simultaneously increasing the capacity of the regulating chamber.

24. In a fluid pressure brake, the combination with a main reservoir, train pipe and brake cylinder, of a regulating valve device having a chamber for controlling the supply of fluid from the main reservoir to the brake cylinder, a valve device for varying the pressure upon the regulating valve device and having a piston subject to the opposing pressures of a piston chamber and an auxiliary chamber, a supplemental chamber, a manually operated valve having ports for establishing communication from the piston chamber to the train pipe in one position, and in another position to close communication to the train pipe and open communication to the main reservoir, and simultaneously open communication from the supplemental chamber to the regulating chamber.

25. In a fluid pressure brake, the combination with a main reservoir, train pipe and brake cylinder, of a regulating valve device having a chamber for controlling the supply of fluid from the main reservoir to the brake cylinder, a valve device for varying the pressure upon the regulating valve device and having a piston subject to the opposing pressures of a piston chamber and an auxiliary chamber, a supplemental chamber, a manually operated valve having ports for establishing communication from the piston chamber to the train pipe in one position, and in another position to cut off the train pipe connection and open communication from the main reservoir to the piston chamber, and in another position to cut off the main reservoir connection and open communication from the auxiliary chamber to the train pipe.

26. A distributing valve device for fluid pressure brakes comprising a regulating chamber, a valve and movable abutment operated by variations in fluid pressure for controlling the supply of fluid to the regulating chamber, and means governed by the pressure in the regulating chamber for controlling the supply of fluid to the brake cylinder.

27. A distributing valve device for fluid pressure brakes comprising a regulating chamber, a valve and movable abutment subject to the train pipe pressure for controlling the supply of fluid to the regulating chamber, and a valve mechanism governed by the pressure in the regulating chamber for controlling the supply of fluid to the brake cylinder.

28. A distributing valve device for fluid pressure brakes comprising a regulating chamber, a valve and movable abutment subject to the train pipe pressure for controlling the supply of fluid to the regulating chamber, another valve for controlling the brake cylinder supply port, a piston for operating said valve, and a regulating valve governed by the pressure in the regulating chamber for controlling the pressure on one side of said piston.

29. In a fluid pressure brake, the combination with a train pipe, engineer's brake valve, and automatic valve mechanism operated by a reduction in train pipe pressure to supply air to the brake cylinder, of a manually operated valve for cutting off the automatic valve from the train pipe and operating brakes independently.

30. In a fluid pressure brake, the combination with a train pipe, engineer's brake valve, and automatic valve mechanism operated by a reduction in train pipe pressure to supply air to the brake cylinder, of means for cutting off the automatic valve from the train pipe, and a manually operated valve for controlling the supply of air to the engine brake cylinder independently of the engineer's brake valve.

31. A distributing valve device for fluid pressure brakes, comprising a regulating chamber, means for controlling the supply of fluid to the regulating chamber, and mechanism governed by the pressure in the regulating chamber for controlling the supply of fluid to the brake cylinder to apply the brakes.

32. In a fluid pressure brake, the combination with a main reservoir and brake cylinder, of a regulating chamber, means for controlling the supply of fluid to the regulating chamber, and a valve mechanism governed by the pressure in the regulating chamber for controlling the supply of fluid from the main reservoir to the brake cylinder.

33. In a fluid pressure brake, the combination with a main reservoir and brake cylinder, of a regulating chamber, a manually controlled valve means for supplying fluid to the regulating chamber, and a valve mechanism governed by the pressure in the regulating chamber for controlling the supply of fluid to the brake cylinder.

34. In a fluid pressure brake, the combination with a main reservoir, brake valve, train pipe, and brake cylinder, of a valve device operated by a reduction in train pipe pressure for supplying fluid from the main reservoir to the brake cylinder.

35. In a fluid pressure brake, the combination with a train pipe, brake cylinder, and an automatic valve device having a piston normally subject to train pipe pressure for controlling the pressure in the brake cylinder, of an independent valve having ports for controlling communication from the train pipe to the piston chamber and for supplying fluid from another source to the piston chamber.

36. In a fluid pressure brake, the combination with a reservoir, train pipe, brake cylinder, and an automatic valve device having a piston and valve for controlling the brake cylinder pressure, of an independent valve having ports for controlling communication from the train pipe to the piston chamber and from the reservoir to the piston chamber.

37. In a fluid pressure brake, the combination with a reservoir, train pipe, automatic brake valve, and brake cylinder, of an automatic valve device acting in response to variations in train pipe pressure to supply fluid to the brake cylinder, and an independent brake valve adapted to cut off said valve device from the train pipe and to control the application and release of the brake independently of the train pipe pressure.

38. In a fluid pressure brake, the combination with a reservoir, train pipe, brake cylinder, and an automatic valve device having a piston normally subject to train pipe pressure for controlling the brake cylinder pressure, of an independent valve controlling communication from the train pipe to the piston chamber, from the reservoir to the piston chamber and from the piston chamber to the atmosphere.

In testimony whereof I have hereunto set my hand.

HERBERT T. HERR.

Witnesses:
 J. W. GOODWIN,
 GEO. N. DICKINSON.